United States Patent [19]

Warren

[11] 4,254,930
[45] Mar. 10, 1981

[54] DRAIN PIPE HANGER

[76] Inventor: Ernest W. Warren, 201 Vistawood La., Marietta, Ga. 30066

[21] Appl. No.: 53,293

[22] Filed: Jun. 29, 1979

[51] Int. Cl.³ .............................................. E21F 17/02
[52] U.S. Cl. ...................................... 248/542; 248/58
[58] Field of Search ...................... 248/542, 62, 63, 58, 248/59, 60, 70, 74 R, 65; 40/316

[56] References Cited

U.S. PATENT DOCUMENTS

| 2,045,307 | 6/1936 | Connell | 248/59 |
| 3,273,837 | 9/1966 | Willert et al. | 248/59 |
| 3,523,515 | 8/1970 | Brown | 248/59 X |
| 3,559,910 | 2/1971 | Babb | 248/74 PB |
| 3,565,375 | 2/1971 | Babb | 248/59 |

FOREIGN PATENT DOCUMENTS 2344992 10/1977 France ....................................... 40/316

Primary Examiner—J. Franklin Foss
Attorney, Agent, or Firm—Newton, Hopkins & Ormsby

[57] ABSTRACT

To facilitate supporting drain pipes at a prescribed grade or slope, a hanger formed of inexpensive material adapted for nailing has a plate-like body provided with a through opening for a pipe and having on opposite sides thereof a graduated distance measuring scale in relief form whose scale graduations may register with the bottom edges of floor joists when the hanger is nailed in position on either side of a joist to establish the required slope of a drain pipe. The pipe receiving through opening may be perpendicular to the plane of the hanger body or may be angled relative thereto.

5 Claims, 4 Drawing Figures

U.S. Patent  Mar. 10, 1981  4,254,930
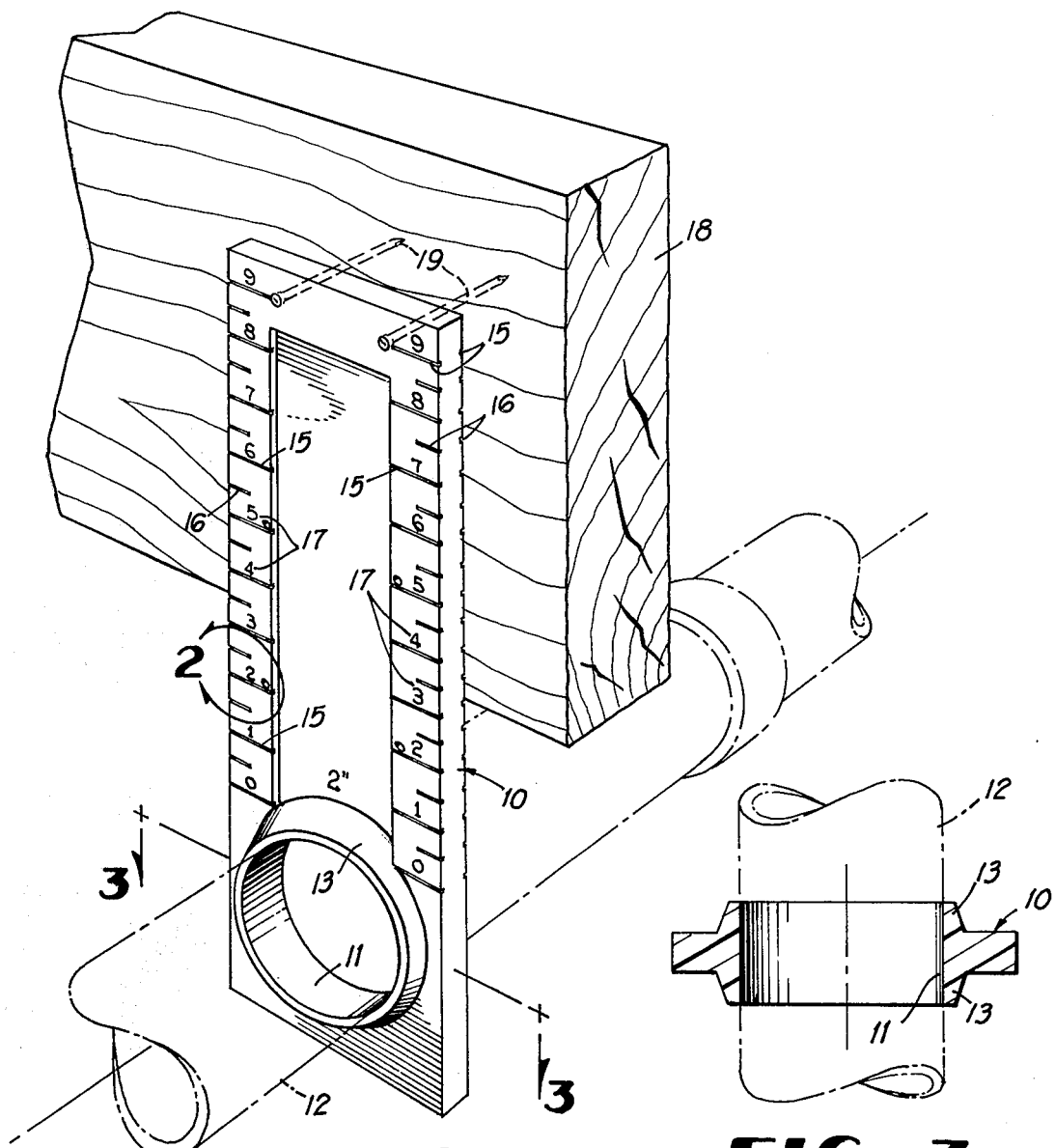
FIG 1
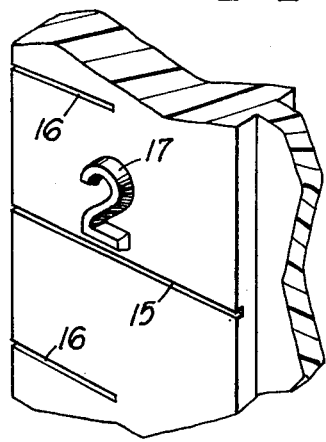
FIG 2
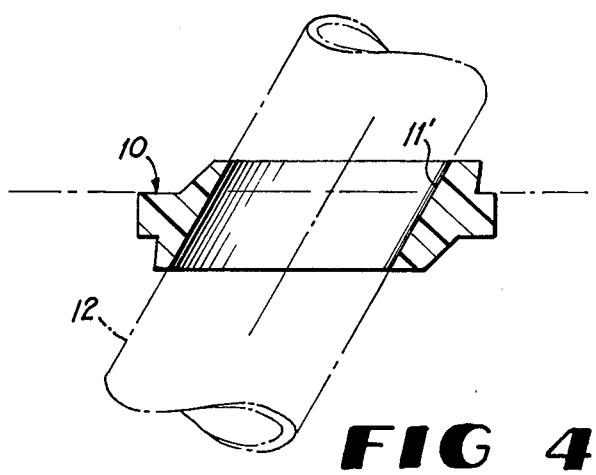
FIG 3
FIG 4

DRAIN PIPE HANGER

BACKGROUND OF THE INVENTION

This invention has for its objective to fulfill a need for a hanger for drain pipes which at the time of installation of the hanger on a floor joist or the like will establish the required grade or slope of the pipe being installed.

Customarily, in the prior art, drain pipes are suspended from floor joists in buildings by some form of strap hanger in a rather haphazard and imprecise manner. Generally, the grade or slope required for the drain pipe undergoing installation is ⅛th inch or ¼th inch per linear foot. No known hanger device is available which will support the drain pipe and establish with precision the slope of the pipe in one unified operation when the hanger is attached to the floor joist and this, in essence, is what the present invention accomplishes.

Additionally, the invention is embodied in a reversible hanger which can be nailed to either side face of a joist with convenience since the hanger is provided on each side thereof with an identical dual edge graduated linear scale in relief characters to facilitate installation in dark basements where visual reading of the scale is difficult. The one-piece hanger can be molded from nailable plastics, wood, fiberboard, or other low cost material.

A further feature of the hanger is that its pipe receiving opening may be formed with an axis normal to the plane of the hanger body or at an angle thereto so that the drain pipe may be installed at right angles to joists or at an acute angle thereto, such as 45 degrees, under right hand or left hand conditions.

The arrangement of the slope measuring scale on the hanger is such that a particular scale graduation can be brought into accurate registration with the lower edge of joist at the time of nailing.

The patented prior art contains diverse teachings relative to pipe hangers and other supports which lack the full capability and versatility of the present invention. The following known United States patents of some interest in connection with the invention are made of record under 37 C.F.R. 1.56:

Nos. 1,362,244 3,273,837 3,049,326 3,559,910 3,884,441.

BRIEF DESCRIPTION OF THE DRAWINGS

FIG. 1 is a perspective view of a drain pipe hanger according to the invention depicting the use thereof.

FIG. 2 is a enlarged fragmentary perspective view of a graduated scale in relief in the area designated at "2" in FIG. 1.

FIG. 3 is a horizontal section taken on line 3—3 of FIG. 1.

FIG. 4 is a similar section showing a variation of the invention.

DETAILED DESCRIPTION

Referring to the drawings in detail wherein like numerals designate like parts, the numeral 10 designates a hanger particularly for drain pipes but also capable of supporting any type of pipe. The hanger 10 is unitary, plate-like and rectangular, as well as elongated. It is formed from a low cost readily nailable material such as wood, fiberboard, and certain plastics. The hanger is substantially rigid.

Near one end, namely the lower end of the hanger during its usage, it is provided with a through opening 11 for a drain pipe 12 to be supported with the required degree of slope. Preferably, the through opening 11 is flanged on opposite sides of the plate-like body of the hanger as indicated at 13.

The drain pipe hanger is provided on both sides and along its opposite longitudinal edges with linear scales 14 graduated in inches and half-inches as at 15 and 16. The two scales on each side of the hanger also have numeric indicia 17 in inches, and the numeric indicia is in ascending order on each scale from zero to nine inches at the top of each scale, as shown. The zero scale graduations are located near the top of the pipe opening 11. All scale graduations and their numeric indicia are laterally aligned on the hanger for precision use.

Preferably, the indicia 17 and scale graduations 15 and 16 are formed in bold relief on both sides of the hanger to facilitate the use thereof in dark cellars and the like where visual reading is difficult, if not impossible. The relief characters may be recessed or raised, as preferred. When the hanger is manufactured from plastics, all of the elements thus far described are molded as a unit.

Customarily, drain pipes such as the pipe 12 are suspended from floor joists, one such joist 18 being shown in FIG. 1. The joists are frequently on four foot centers in parallel relationship and with their lower edges in a common horizontal plane. The required grade or slope for most drain pipes is ⅛th or ¼th inch per linear foot. Therefore, to achieve a ¼th inch per foot slope of the pipe 12 where the joists are on four foot centers, each hanger 10 should be dropped down 1 inch before nailing to each succeeding joist.

This installation of hangers can be done with precision by placing either major face of the reversible hanger against either side of a joist 18, depending on what is most convenient, and aligning the bottom edge of the joist across a selected pair of the scale graduations 15 or 16, as clearly indicated in FIG. 1. Suitable nails 19 are then driven through the upper end portion of the hanger to attach the same solidly in the selected adjusted position against the joist.

In practice, a number of the hangers 10 will be slipped onto a drain pipe and the pipe will be raised into position, and then the hangers 10 can simply be ticked off one at a time along the pipe and nailed to successive floor joists in the described manner to estabish the desired grade or slope for the pipe being hung from the joists.

When the through opening 11 is normal to the plate body of the hanger and joist, the suspended pipe 12 will be at right angles to the floor joist. As illustrated in FIG. 4, the hanger through opening 11' may extend at an angle to the plane of the hanger, such as 45 degrees or any other chosen angle. In such case, when the hanger is height adjusted with reference to the bottom edge of a joist and nailed in place, the drain pipe with the proper slope imparted to it will extend at an angle of 45 degrees to the supporting joists. The hangers may be manufactured with through openings running on various angles. By reversing the hanger having an angled through opening, the hangers can be employed in either a right hand or left hand mode.

It may now be seen that the invention satisfies with efficiency, convenience and economy a specific need of the art which heretofore has not been dealt with, except on a hit-and-miss non-uniform basis. The drain pipe hanger is versatile, very convenient to install with accuracy, very economical to manufacture and is also rugged and durable. Its advantages should now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A pipe hanger particularly for drain pipes comprising a plate-like body portion having aligned linear measuring scales on opposite sides thereof and extending in one direction on said hanger, said hanger having a pipe receiving through opening located near corresponding ends of said scales said scales having graduations which extend to the edges of the body and which are adapted to be placed in alignment with the lower end of a pipe supporting member, the scales and fastener receiving means located on the upper end of said plate like body being so marked as to indicate the distance between the graduations so aligned and a pipe supported by said hanger.

2. A pipe hanger as defined in claim 1, and said body portion being rectangular, said through opening being located at one end portion of the body portion and said scales extending from the other end of the body portion toward said through opening.

3. A pipe hanger as defined in claim 1, and said scales having graduations and numeric indicia formed in relief to enable the use of the pipe hanger in a dark environment.

4. A pipe hanger as in claim 1 wherein the through opening in the hanger is inclined with respect to the plane of the hanger.

5. A pipe hanger as in claim 4 wherein linear measuring scales are provided on opposite faces of the plate-like body as well as on opposite sides thereof.

* * * * *